US009589211B2

(12) United States Patent
Lay et al.

(10) Patent No.: US 9,589,211 B2
(45) Date of Patent: Mar. 7, 2017

(54) LEARNING-BASED AORTA SEGMENTATION USING AN ADAPTIVE DETACH AND MERGE ALGORITHM

(71) Applicant: Siemens Healthcare GmbH, Erlanger (DE)

(72) Inventors: Nathan Lay, Plainsboro, NJ (US); David Liu, Franklin Park, NJ (US); Jan Kretschmer, Nürnberg (DE); Shaohua Kevin Zhou, Plainsboro, NJ (US)

(73) Assignee: Siemens Healthcare GmbH, Erlanger (DE)

( * ) Notice: Subject to any disclaimer, the term of this patent is extended or adjusted under 35 U.S.C. 154(b) by 0 days.

(21) Appl. No.: 14/707,503

(22) Filed: May 8, 2015

(65) Prior Publication Data

US 2016/0328631 A1 Nov. 10, 2016

(51) Int. Cl.
G06K 9/00 (2006.01)
G06K 9/62 (2006.01)
G06T 7/00 (2006.01)
G06K 9/52 (2006.01)
G06T 11/20 (2006.01)
G06T 19/20 (2011.01)
G06T 15/08 (2011.01)

(52) U.S. Cl.
CPC ............ G06K 9/6267 (2013.01); G06K 9/52 (2013.01); G06K 9/6256 (2013.01); G06T 7/0012 (2013.01); G06T 11/206 (2013.01); G06T 15/08 (2013.01); G06T 19/20 (2013.01); G06T 2207/10081 (2013.01); G06T 2207/30008 (2013.01); G06T 2207/30101 (2013.01)

(58) Field of Classification Search
CPC .......... G06K 9/52; G06K 9/34; G06K 9/6277; G06T 2207/10081; G06T 2207/30101; G06T 2207/20112; G06T 7/0012; G06T 15/08; G06T 19/20; G06T 5/00; G06T 7/0087

See application file for complete search history.

(56) References Cited

U.S. PATENT DOCUMENTS 6,674,925 B1 1/2004 Schoepflin et al.
6,754,376 B1 * 6/2004 Turek ................... G06T 7/0012
  382/131
7,116,800 B2 10/2006 Farmer
7,123,760 B2 * 10/2006 Mullick .................. G06T 5/50
  378/21

(Continued)

*Primary Examiner* — Amara Abdi

(57) ABSTRACT

Systems and methods for segmenting a structure of interest in medical imaging data include generating a binary mask highlighting structures in medical imaging data, the highlighted structures comprising a connected component including a structure of interest. A probability map is computed by classifying voxels in the highlighted structures using a trained classifier. A plurality of detaching operations is performed on the highlighted structures to split the connected component into a plurality of detached connected components. An optimal detaching parameter is determined representing a number of the detaching operations. A detached connected component resulting from performing the number of detaching operations corresponding to the optimal detaching parameter is classified as the structure of interest based on the probability map and the trained classifier.

31 Claims, 4 Drawing Sheets

(56) References Cited

U.S. PATENT DOCUMENTS

| | | | |
|---|---|---|---|
| 8,064,668 B2* | 11/2011 | Dutta | G06K 9/03 |
| | | | 382/128 |
| 8,077,969 B2 | 12/2011 | Rossato et al. | |
| 8,126,268 B2 | 2/2012 | Rossato et al. | |
| 8,233,676 B2 | 7/2012 | Ngan et al. | |
| 2004/0153247 A1* | 8/2004 | Czernuszenko | G01V 1/30 |
| | | | 702/14 |
| 2005/0017972 A1* | 1/2005 | Poole | A61B 5/7445 |
| | | | 345/424 |
| 2007/0127799 A1* | 6/2007 | Reisman | G06T 7/0042 |
| | | | 382/128 |
| 2007/0206844 A1* | 9/2007 | Russakoff | G06K 9/38 |
| | | | 382/132 |
| 2011/0222750 A1* | 9/2011 | Liao | A61B 6/4441 |
| | | | 382/131 |
| 2012/0209652 A1* | 8/2012 | Khosla | G06Q 10/0631 |
| | | | 705/7.16 |
| 2013/0083983 A1* | 4/2013 | Zhong | G06T 7/0081 |
| | | | 382/128 |
| 2013/0182931 A1* | 7/2013 | Fan | G06T 7/0081 |
| | | | 382/131 |
| 2014/0247977 A1* | 9/2014 | Han | G06K 9/34 |
| | | | 382/159 |

* cited by examiner

LEARNING-BASED AORTA SEGMENTATION USING AN ADAPTIVE DETACH AND MERGE ALGORITHM

BACKGROUND OF THE INVENTION

The present invention relates generally to segmentation of an anatomical object in medical imaging data, and more particularly to learning-based aorta segmentation using an adaptive detach and merge algorithm.

Image segmentation is the partitioning of an image into regions of pixels sharing certain characteristics. In medical imaging, segmentation may be used to, e.g., locate structures, plan for surgery, and provide surgical guidance. Segmentation of the aorta is particularly challenging due to pathologies, partial fields of view, and its proximity to bones. For example, current solutions may segment part of the vertebral column as the aorta. Further, the aorta itself can exhibit aneurysms, stenosis, and aortic dissection with a highly variable shape, which can be difficult to model. The shape also depends on the field of view, which may or may not include the aortic arch.

BRIEF SUMMARY OF THE INVENTION

In accordance with an embodiment, systems and methods for segmenting a structure of interest in medical imaging data include generating a binary mask highlighting structures in medical imaging data, the highlighted structures comprising a connected component including a structure of interest. A probability map is computed by classifying voxels in the highlighted structures using a trained classifier. A plurality of detaching operations is performed on the highlighted structures to split the connected component into a plurality of detached connected components. An optimal detaching parameter is determined representing a number of the detaching operations. A detached connected component resulting from performing the number of detaching operations corresponding to the optimal detaching parameter is classified as the structure of interest based on the probability map and the trained classifier.

In accordance with an embodiment, systems and methods for segmenting an aorta from a contrast-enhanced computed tomography (CT) volume include generating a binary mask highlighting structures in the contrast-enhanced CT volume, the highlighted structures comprising a connected component including an aorta. A probability map is computed by classifying voxels in the highlighted structures using a trained classifier. A plurality of detaching operations is performed on the highlighted structures to split the connected component into a plurality of detached connected components. An optimal detaching parameter is determined representing a number of the detaching operations. A detached connected component resulting from performing the number of detaching operations corresponding to the optimal detaching parameter is classified as the aorta based on the probability map and the trained classifier.

These and other advantages of the invention will be apparent to those of ordinary skill in the art by reference to the following detailed description and the accompanying drawings.

DETAILED DESCRIPTION

The present invention generally relates to learning-based aorta segmentation using an adaptive detach and merge algorithm. Embodiments of the present invention are described herein to give a visual understanding of methods for learning-based aorta segmentation. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Further, it should be understood that while the embodiments discussed herein may be discussed with respect to medical imaging data of a patient, the present principles are not so limited. Embodiments of the present invention may be employed for segmentation of any imaging data of any subject.

Figure 1:
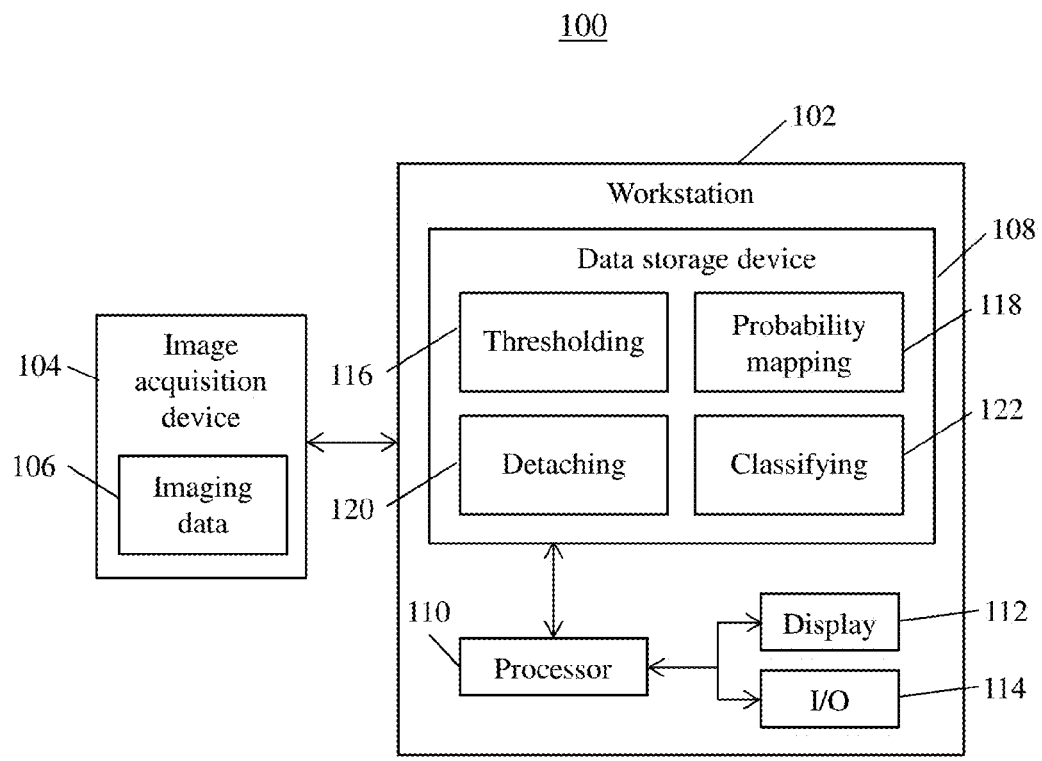
FIG. 1 shows a system for segmenting the aorta in medical imaging data, in accordance with one embodiment.

FIG. 1 shows a system 100 for segmenting the aorta in medical imaging data, in accordance with one or more embodiments. Elements of system 100 may be co-located (e.g., within an operating room environment or facility) or remotely located (e.g., at different areas of a facility or different facilities). System 100 includes workstation 102, which may be used for assisting a user (e.g., a clinician) during a procedure. Workstation 102 includes one or more processors 110 communicatively coupled to data storage device 108, display device 112, and input/output devices 114. Data storage device 108 stores a plurality of modules representing functionality of workstation 102 performed when executed on processor 110. It should be understood that workstation 102 may also include additional elements, such as, e.g., a communications interface.

Workstation 102 receives medical imaging data 106 from image acquisition device 104 of a structure of interest of a subject, such as, e.g., a patient. The structure of interest may include any structure of the subject to be represented using segmentation. In one example, the structure of interest is the aorta of a patient. Preferably, imaging data 106 includes high-contrast imaging data. For example, in one embodiment, image acquisition device 104 is a computed tomography (CT) image acquisition device. The CT image acquisition device may image a patient having a contrast agent injected into its bloodstream to generate a three-dimensional (3D) volumetric CT imaging data where vessels, including the aorta, appear with high contrast. It should be understood that image acquisition device 104 may be of any other suitable modality. In one embodiment, imaging data 106 is received by workstation 102 directly from image acquisition device 104 imaging the subject. In another embodiment, imaging data 106 is received by workstation 102 by loading previously stored imaging data of the subject acquired using image acquisition device 104.

In high contrast imaging data, bones and vessels are represented with similar intensity values. Workstation 102 performs segmentation to segment bones for removal from imaging data 106, providing a clearer representation of the aorta and other vessels. It should be understood that segmentation may additionally and/or alternatively be performed to segment vessels for retaining in imaging data 106.

Thresholding module 116 is configured to highlight bright structures in imaging data 106. In one embodiment, thresholding module 116 performs intensity thresholding to highlight the high intensity voxels (i.e., voxels having an intensity greater than a threshold) in imaging data 106 in the form of a binary mask. The binary mask represents low intensity voxels as zeros and high intensity voxels as ones, which are determined based on a comparison with an intensity thresholding value. The intensity thresholding value may be a predetermined value. Other suitable methods may also be employed to generate the binary mask, such as, e.g., a region growing-type approach.

The binary mask results in highlighted structures. Since bones and vessels are represented with similar intensity values, the highlighted structures of the binary mask include bones and vessels. For example, in a cardiac CT volume, the highlighted structures may include cortical bones, the aorta, the heart, and other vessels. The aorta may often times be connected to nearby components (e.g., vertebrae) by a few voxels in the binary mask.

The highlighted structures of the binary mask may include one or more connected components. Each isolated grouping of voxels in the highlighted structures in the binary mask is referred to as a connected component. In one example, the highlighted structures in the binary mask are all connected resulting in a single connected component. In another example, the highlighted structures in the binary mask form a number of distinct groups resulting in a corresponding number of separate connected components. The binary mask may include any number of connected components.

In some embodiments, workstation 102 receives imaging data 106 with the binary mask directly generated.

Probability mapping module 118 is configured to compute a probability map over the highlighted structures of the binary mask. The probability map may indicate a probability of each voxel in the highlighted structures as being a bone or a vessel. In one embodiment, a trained bone voxel classifier may be employed to label voxels in the highlighted structures with a probability of being a bone. Additionally or alternatively, in some embodiments, a trained vessel voxel classifier may be employed to label voxels in the highlighted structures with a probability of being a vessel.

The bone voxel classifier and vessel voxel classifier may be any type of machine-learning based classifier, such as, e.g., a probabilistic boosting tree (PBT) classifier, a random forest classifier, a neural network classifier, etc. The classifiers may be trained with annotated training data in a prior offline training stage. The trained classifiers should provide consistent behavior. For example, the trained bone voxel classifier should not assign high bone probabilities to vessels most of the time, while assigning high probabilities to bones most of the time. Likewise, the trained vessel voxel classifier should not assign low probabilities to vessels most of the time, while assigning low probabilities to bones most of the time.

Detaching module 120 is configured to perform one or more detaching operations on the highlighted structures of the binary mask to split the one or more connected components into separate components. For example, the one or more detaching operations may result in a split of a connected component into smaller connected components, such as, e.g., the aorta and vertebrae cortical bone structures. As cortical bone tends to be thin and sparse, these structures often vanish during detaching operations.

In one embodiment, prior to each detaching operation, smaller connected components may be removed. For example, the top N largest connected components may be identified, where N is any positive integer, such as, e.g., a predetermined number. The one or more detaching operations may be performed on the top N largest connected components. The remaining connected components are removed from further processing. That is, the values for the voxels of the remaining connect components are set to zero in the binary mask and removed from the highlighted structures.

In one embodiment, the one or more detaching operations include one or more erosion operations performed on the one or more connected components in the highlighted structures of the binary mask. Each erosion operation may remove a layer of voxels from around a periphery of the one or more connected components in the highlighted structures. For example, the layer of voxels may be removed by setting its value in the binary mask to zero (from one). The layer of voxels removed at each erosion operation may be any number of voxels, such as, e.g., a predetermined number of voxels. For example, the erosion operation may remove a layer of one voxel from around the periphery of the connected components in the highlighted structures. Other detaching operations may also be employed.

In an advantageous implementation, an optimal detaching parameter representing an optimal number of detaching operations (e.g., erosion operations) to be performed by detaching module 120 is not known in advance. For example, some types of aortas are thin and too much erosion can eliminate the aorta component entirely. Other types of aortas are touching nearby vertebrae components in more than a few voxels and require more erosion. As such, relying on a fixed detaching parameter may lead to inaccurate results.

In order to determine the optimal detaching parameter (i.e., the optimal number of erosion operations), the highlighted structures of the binary mask are observed over a number of consecutive detaching operations. The number of detaching operations may be restricted to a predetermined maximum number of detaching operations. In one example, the detaching operations are limited to a maximum of three detaching operations.

After each detaching operation, each resulting connected component is labeled and restored. For example, each resulting connected component may be labeled as either bone or not bone (i.e., vessel). In another example, each resulting connected component may be labeled as either vessel or not vessel (i.e., bone). The label may be determined by using, e.g., the bone voxel classifier or the vessel voxel classifier discussed above. For example, the probability of each vessel in a respective connected component may be combined (e.g., by averaging). The combined probability may be compared with a threshold value (e.g., 0.50) to determine the labeling.

After labeling, the connected components are restored back to their original size. For example, morphological dilation may be performed to restore the labeled connected components back to the original size (of the initial connected component). This will result in some adjacent voxels in the original connected component being labeled as bone and non-bone (vessel), thus providing a boundary between the bone and vessel regions in the original connected component.

In order to observe the highlighted structures of the binary mask over a number of consecutive detaching operations, each initial connected component (i.e., before detaching operations are performed) in the highlighted structures of the binary mask may be represented as its own tree graph. The tree graph represents how a respective connected component splits into separate connected components over consecutive detaching operations. Each initial connected component in the highlighted structures of the binary mask is represented as a root node in a respective tree graph. Components splitting from the connected component after a detaching operation are represented as child nodes. For example, a connected component that splits into two connected components after a detaching operation is represented as two separate child nodes from the root node. Each detaching operation results in an additional layer in the tree graph. If the detaching operation does not result in a split of a connected component, a single child node is added in the additional layer of the tree graph.

Figure 2:
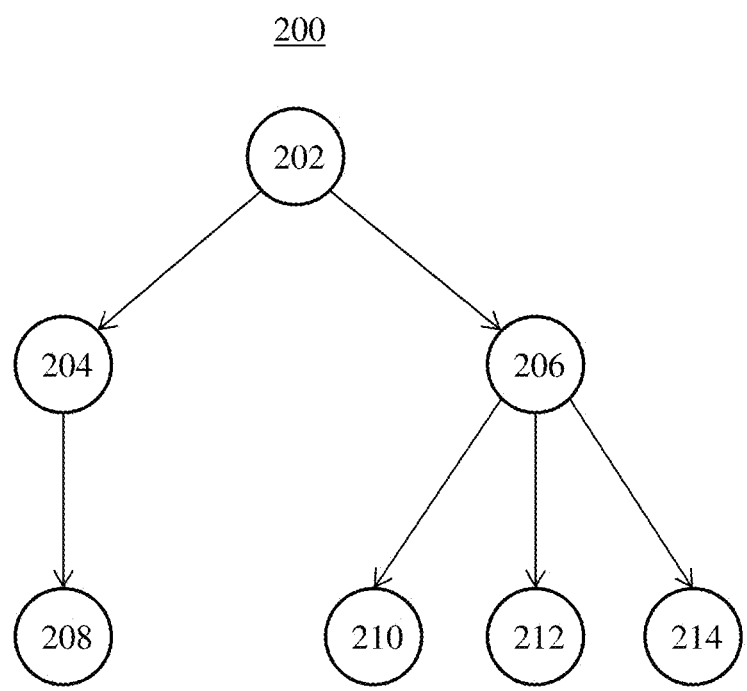
FIG. 2 shows an exemplary tree graph, in accordance with one embodiment.

FIG. 2 depicts an exemplary tree graph 200, in accordance with one or more embodiments. Tree graph 200 represents how an initial connected component splits over a number of consecutive erosion operations. The initial connected component is represented as root node 202 prior to an erosion operation. After a first erosion operation, the connected component represented as root node 202 is split into two separate components, represented as nodes 204 and 206, which are child nodes of root node 202. After a second erosion operation, the connected component represented as node 204 did not split and therefore results in a single child, node 208. However, the second erosion operation results in the connected component represented as node 206 splitting into three separate connected components, represented as nodes 210, 212, and 214. Additional erosion operations may result in additional child nodes in this manner.

The optimal detaching parameter is computed based on the tree graphs and probability map computed by probability mapping module 118. Specifically, the detaching parameter that maximizes an information gain is selected as the optimal detaching parameter. A fixed (e.g., predetermined) initial information gain is assigned for a detaching parameter of zero (i.e., no erosions). For example, the initial information gain may be determined empirically based on trial-and-error. The information gain IG for subsequent detaching operation is computed as in equation (1).

$$IG(A, B_1, B_2, \ldots, B_i) = Gini(P(A \cup B)) - \sum_{i=1}^{N} \left( \frac{B_i}{(A \cup B)} Gini(P(B_i)) \right) \quad (1)$$

A is the initial connected component (i.e., prior to the detaching operations), $B_i$ is the connected components resulting from a detaching operation, and B is the union of all $B_i$. The function P(S) is the average probability on the component S of being, e.g., a bone or a vessel (based on the classifier used). $Gini(p)=4*p(1-p)$ is a purity function that ranges from [0,1], where 0 is considered pure. The information gain is relatively large when one or more pure component $B_i$ breaks off of the initial connected component A. The detaching parameter that results in maximum information gain is selected as the optimal detaching parameter.

In some embodiments, multiple optimal detaching parameters may be determined for different regions of imaging data 106.

Classifying module 122 is configured to classify the labeled (and restored) connected components determined based on the optimal detaching parameter. The component may be labeled as bone or not bone, or as vessel or not vessel. Classifying module 122 may employ, e.g., a trained bone voxel classifier or a trained vessel voxel classifier, as discussed above. The average probability P of each labeled component S resulting from the detaching operations according to the optimal detaching parameter is thresholded. For example, when using a bone voxel classifier, the vessel component should satisfy P(S)<t for some conservatively low (e.g., predetermined) threshold t. Similarly, for a vessel voxel classifier, the vessel component should satisfy P(S)>t for some conservatively high threshold t. From all the classified vessel components, other available information may also be used to classify the aorta component, such as, e.g., anatomical information. For example, anatomical information, such as, e.g., the size of the connected component may be used to differentiate the aorta connected component from other vessel connected components that may also have a low bone probability (or high vessel probability). In this example, the vessel connected component having a largest size may be classified as the aorta. In some embodiments, a machine learning based classier may be employed to further classify the classified vessel components as, e.g., the aorta.

Advantageously, workstation 102 may aid a clinician during a procedure of a patient by providing image segmentation for locating structures, planning for surgery, providing surgical guidance, etc. using display 112 and input/output 114. Workstation 102 provides for fast, learning-based image segmentation. Workstation 102 can segment, e.g., contrasted aortas with or without pathologies since it imposes no shape constraints. Workstation 102 can also segment the aorta in several different fields of view. It should be appreciated that while the embodiments herein were discussed with respect to segmentation of the aorta, it should be appreciated that the embodiments may be applied to any structure.

Figure 3:
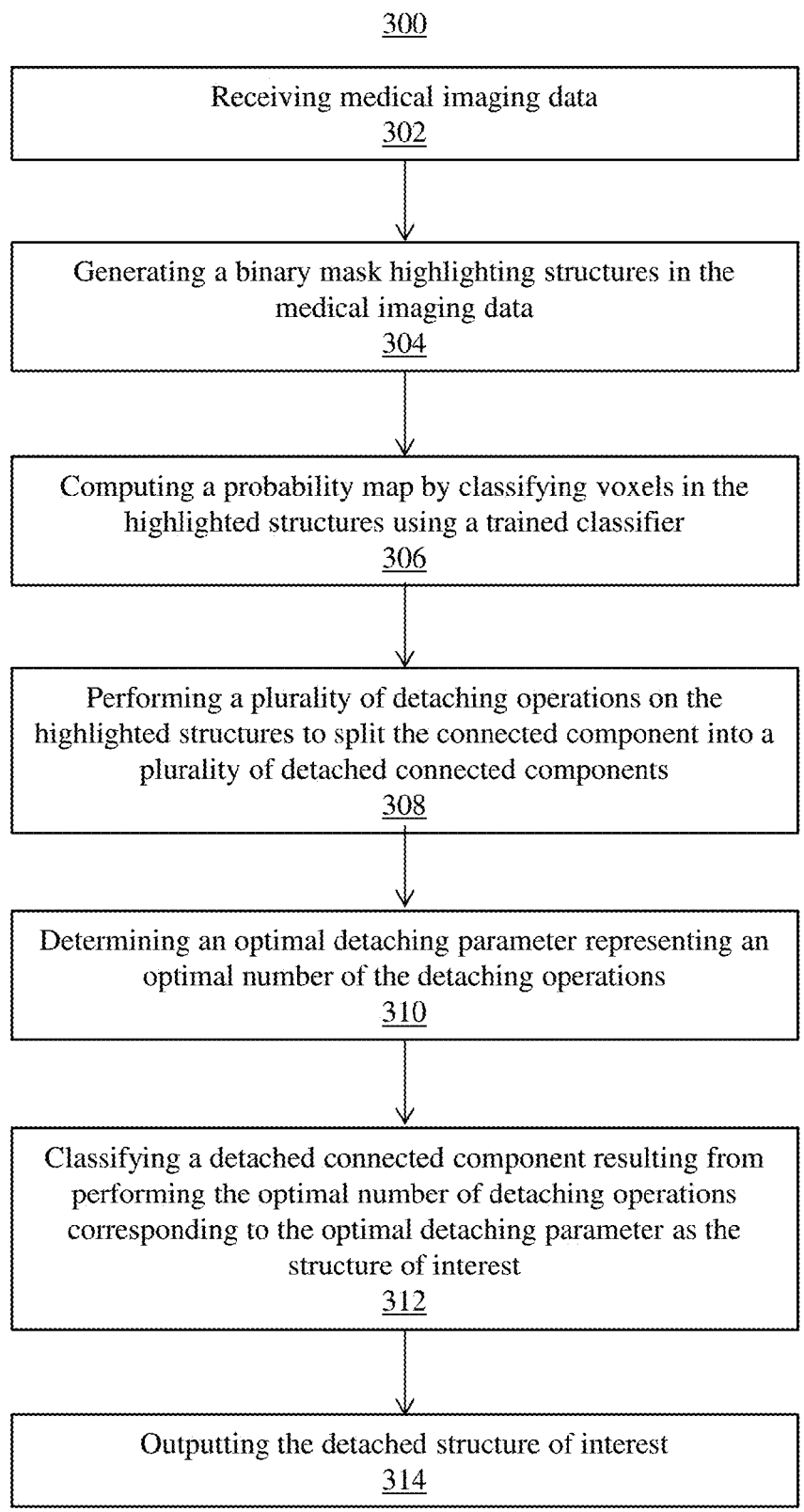
FIG. 3 shows a method for segmenting the aorta in medical imaging data, in accordance with one embodiment.

FIG. 3 shows a method 300 for segmenting the aorta in medical imaging data, in accordance with one or more embodiments. At step 302, medical imaging data is received. The medical imaging data may be of any suitable modality. For example, in one embodiment, the medical imaging data includes contrast enhanced 3D CT medical imaging data. The medical imaging data may be directly received from an image acquisition device or may be received by loading previously stored medical imaging data.

At step 304, a binary mask is generated highlighting structures in the medical imaging data. In one embodiment, the binary mask is generated based on intensity thresholding by comparing an intensity of each voxel in the medical imaging data with an intensity thresholding value. The highlighted structures include voxels in the medical imaging data that satisfy the intensity thresholding value, which are represented with a one in the binary mask, while voxels that do not satisfy the intensity thresholding value are represented with a zero in the binary mask.

The highlighted structures comprise a connected component including a structure of interest (e.g., the aorta), as well as other structures (e.g., vertebrae), since bones and vessels have similar intensity values. Each isolated grouping of voxels in the highlighted structures in the binary mask is referred to as a connected component. The highlighted structures may include a single connected component, or a plurality of connected components.

At step 306, a probability map is computed by classifying voxels in the highlighted structures using a trained classifier. The probability map may indicate a probability of each voxel in the highlighted structures as being one of a bone and a vessel. In one embodiment, a trained bone voxel classifier may be employed to label voxels in the highlighted structures with a probability of being a bone. In other embodiments, a trained vessel voxel classifier may be employed to label voxels in the highlighted structures with a probability of being a vessel.

At step 308, a plurality of detaching operations is performed on the highlighted structures to split the connected component into a plurality of detached connect components. In one embodiment, the plurality of detaching operations includes a plurality of erosion operations. Each erosion operation may remove a layer of voxels from a periphery of the connected component. For each erosion operation, to determine the optimal detaching parameter, the resulting connected components are labeled, and then the labeled connected components can be dilated to restore each connected component to an original size.

In one embodiment, prior to performing each of the plurality of detaching operations, smaller connected components are filtered from the highlighted structure. For example, the top N largest connected components may be determined, where N is any positive integer. The one or more detaching operations may then be performed on the top N largest connected components.

At step 310, an optimal detaching parameter is determined representing an optimal number of the detaching operations. Relying on a fixed detaching parameter may lead to inaccurate results, since a structure of interest may be of different sizes and can be eliminated entirely by too many detaching operations. The optimal detaching parameter is determined as a number of detaching operations to perform on the connected component that provides for a maximum information gain. The optimal detaching parameter may be subject to a maximum detaching parameter value. The information gain may be computed as in equation (1).

In one embodiment, the optimal detaching parameter is determined by representing each connected component in the highlighted structures as its own tree graph. The tree graph represents how a respective connected component splits into one or more resulting connected components over a number of detaching operations. Each initial connected component (i.e., before detaching operations are performed) in the highlighted structures are represented as root nodes in the tree graph. The one or more resulting connected components are represented as child nodes of a respective node. Each detaching operation results in an additional layer in the tree graph. The probability map may be used to calculate the probability for each node (representing a connected component) as an average of the probabilities for the voxels in the corresponding connected component. These probabilities are used in equation (1) to determine the optimal detaching parameter.

At step 312, the detached connected component resulting from performing the optimal number of detaching operations corresponding to the optimal detaching parameter is classified as the structure of interest. The structure of interest may be classified by computing an average probability of voxels of the detached connected component resulting from performing the optimal number of detaching operations corresponding to the optimal detaching parameter as being one of a bone and a vessel, and comparing the average probability with a threshold. Other anatomical information may also be used to classify the detached structure of interest.

At step 314, the detached structure of interest is output using a display device. The display may also include classification or probability information.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 3. Certain steps of the methods described herein, including one or more of the steps of FIG. 3, may be performed by a server or by another processor in a network-based cloud-computing system. Certain steps of the methods described herein, including one or more of the steps of FIG. 3, may be performed by a client computer in a network-based cloud computing system. The steps of the methods described herein, including one or more of the steps of FIG. 3, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 3, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 4:
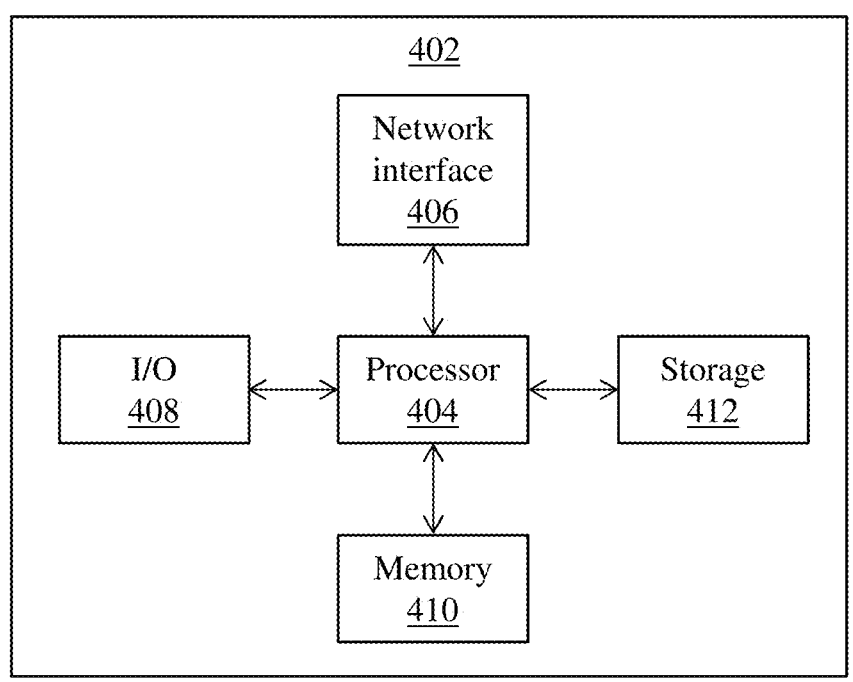
FIG. 4 shows a high-level block diagram of a computer for performing image segmentation, in accordance with one embodiment.

A high-level block diagram 400 of an example computer that may be used to implement systems, apparatus, and methods described herein is depicted in FIG. 4. Computer 402 includes a processor 404 operatively coupled to a data storage device 412 and a memory 410. Processor 404 controls the overall operation of computer 402 by executing computer program instructions that define such operations. The computer program instructions may be stored in data storage device 412, or other computer readable medium, and loaded into memory 410 when execution of the computer program instructions is desired. Thus, the method steps of FIG. 3 can be defined by the computer program instructions stored in memory 410 and/or data storage device 412 and controlled by processor 404 executing the computer program instructions. For example, the computer program instructions can be implemented as computer executable code programmed by one skilled in the art to perform the method steps of FIG. 3 and the modules of workstation 102 of FIG. 1. Accordingly, by executing the computer program instructions, the processor 404 executes the method steps of FIG. 3 and modules of workstation 102 of FIG. 1. Computer 404 may also include one or more network interfaces 406 for communicating with other devices via a network. Computer 402 may also include one or more input/output devices 408 that enable user interaction with computer 402 (e.g., display, keyboard, mouse, speakers, buttons, etc.).

Processor 404 may include both general and special purpose microprocessors, and may be the sole processor or one of multiple processors of computer 402. Processor 404 may include one or more central processing units (CPUs), for example. Processor 404, data storage device 412, and/or memory 410 may include, be supplemented by, or incorporated in, one or more application-specific integrated circuits (ASICs) and/or one or more field programmable gate arrays (FPGAs).

Data storage device 412 and memory 410 each include a tangible non-transitory computer readable storage medium. Data storage device 412, and memory 410, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 408 may include peripherals, such as a printer, scanner, display screen, etc. For example, input/output devices 480 may include a display device such as a cathode ray tube (CRT) or liquid crystal display (LCD) monitor for displaying information to the user, a keyboard, and a pointing device such as a mouse or a trackball by which the user can provide input to computer 402.

Any or all of the systems and apparatus discussed herein, including elements of workstation 102 of FIG. 1, may be implemented using one or more computers such as computer 402.

One skilled in the art will recognize that an implementation of an actual computer or computer system may have other structures and may contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for segmenting a structure of interest in medical imaging data, comprising:
generating a binary mask highlighting structures in medical imaging data, the highlighted structures comprising a connected component including a structure of interest;
computing a probability map by classifying voxels in the highlighted structures using a trained classifier;
performing a plurality of detaching operations on the highlighted structures to split the connected component into a plurality of detached connected components;
determining an optimal detaching parameter representing a number of the detaching operations; and
classifying a detached connected component resulting from performing the number of detaching operations corresponding to the optimal detaching parameter as the structure of interest based on the probability map and the trained classifier.

2. The method as recited in claim 1, wherein generating a binary mask highlighting structures in medical imaging data comprises:
applying intensity thresholding to the medical imaging data to determine the highlighted structures.

3. The method as recited in claim 1, wherein computing a probability map by classifying voxels in the highlighted structures using a trained classifier comprises at least one of:
computing a probability of each voxel in the highlighted structures as being a bone using a trained bone classifier; and
computing a probability of each voxel in the highlighted structures as being a vessel using a trained vessel classifier.

4. The method as recited in claim 1, wherein performing a plurality of detaching operations on the highlighted structures to split the connected component into a plurality of detached connected components comprises:
performing a plurality of erosion operations to remove a layer of voxels from a periphery of the highlighted structures.

5. The method as recited in claim 1, wherein determining an optimal detaching parameter representing a number of the detaching operations comprises:
determining the optimal detaching parameter representing the number of the detaching operations that provides for a maximum information gain.

6. The method as recited in claim 1, wherein determining an optimal detaching parameter representing a number of the detaching operations comprises:

generating a tree graph for the connected component in the highlighted structures representing how the connected component splits into the plurality of detached connected components over the plurality of detaching operations.

7. The method as recited in claim 6, wherein determining an optimal detaching parameter representing a number of the detaching operations further comprises:
calculating a probability for each node in the tree graph based on the probability map; and
determining the optimal detaching parameter based on the probability for each node in the tree graph.

8. The method as recited in claim 6, wherein generating a tree graph for the connected component in the highlighted structures representing how the connected component splits into the plurality of detached connected components over the plurality of detaching operations comprises:
representing the plurality of detached connected components as respective child nodes in the tree graph.

9. The method as recited in claim 1, wherein determining an optimal detaching parameter representing a number of the detaching operations comprises:
after each of the plurality of detaching operations:
labeling each detached connected component resulting from a respective one of the plurality of detaching operations based on probabilities associated with voxels in the respective detached connected component; and
dilating each labeled detached connected component.

10. The method as recited in claim 1, wherein classifying a detached connected component resulting from performing the number of detaching operations corresponding to the optimal detaching parameter as the structure of interest based on the probability map comprises:
computing an average probability of voxels of the detached connected component resulting from performing the number of detaching operations corresponding to the optimal detaching parameter as being one of a bone and a vessel; and
comparing the average probability with a threshold to classify the detached connected component resulting from performing the number of detaching operations corresponding to the optimal detaching parameter as the structure of interest.

11. The method as recited in claim 1, wherein performing a plurality of detaching operations on the highlighted structures to split the connected component into a plurality of detached connected components comprises:
determining top N largest connected components in the highlighted structures, where N is any positive integer; and
performing the plurality of detaching operations on the top N largest connected components.

12. The method as recited in claim 1, wherein generating a binary mask highlighting structures in medical imaging data comprises:
generating the binary mask highlighting high contrast structures in a contrast enhanced three-dimension computed tomography (CT) volume.

13. An apparatus for segmenting a structure of interest in medical imaging data, comprising:
means for generating a binary mask highlighting structures in medical imaging data, the highlighted structures comprising a connected component including a structure of interest;
means for computing a probability map by classifying voxels in the highlighted structures using a trained classifier;
means for performing a plurality of detaching operations on the highlighted structures to split the connected component into a plurality of detached connected components;
means for determining an optimal detaching parameter representing a number of the detaching operations; and
means for classifying a detached connected component resulting from performing the number of detaching operations corresponding to the optimal detaching parameter as the structure of interest based on the probability map and the trained classifier.

14. The apparatus as recited in claim 13, wherein the means for generating a binary mask highlighting structures in medical imaging data comprises:
means for applying intensity thresholding to the medical imaging data to determine the highlighted structures.

15. The apparatus as recited in claim 13, wherein the means for computing a probability map by classifying voxels in the highlighted structures using a trained classifier comprises at least one of:
means for computing a probability of each voxel in the highlighted structures as being a bone using a trained bone classifier; and
means for computing a probability of each voxel in the highlighted structures as being a vessel using a trained vessel classifier.

16. The apparatus as recited in claim 13, wherein the means for performing a plurality of detaching operations on the highlighted structures to split the connected component into a plurality of detached connected components comprises:
means for performing a plurality of erosion operations to remove a layer of voxels from a periphery of the highlighted structures.

17. The apparatus as recited in claim 13, wherein the means for determining an optimal detaching parameter representing a number of the detaching operations comprises:
means for determining the optimal detaching parameter representing the number of the detaching operations that provides for a maximum information gain.

18. The apparatus as recited in claim 13, wherein the means for determining an optimal detaching parameter representing a number of the detaching operations comprises:
means for generating a tree graph for the connected component in the highlighted structures representing how the connected component splits into the plurality of detached connected components over the plurality of detaching operations.

19. The apparatus as recited in claim 13, wherein the means for determining an optimal detaching parameter representing a number of the detaching operations comprises:
after each of the plurality of detaching operations:
means for labeling each detached connected component resulting from a respective one of the plurality of detaching operations based on probabilities associated with voxels in the respective detached connected component; and
means for dilating each labeled detached connected component.

20. The apparatus as recited in claim 13, wherein the means for classifying a detached connected component resulting from performing the number of detaching operations corresponding to the optimal detaching parameter as the structure of interest based on the probability map comprises:

means for computing an average probability of voxels of the detached connected component resulting from performing the number of detaching operations corresponding to the optimal detaching parameter as being one of a bone and a vessel; and means for comparing the average probability with a threshold to classify the detached connected component resulting from performing the number of detaching operations corresponding to the optimal detaching parameter as the structure of interest.

21. The apparatus as recited in claim 13, wherein the means for generating a binary mask highlighting structures in medical imaging data comprises:

means for generating the binary mask highlighting high contrast structures in a contrast enhanced three-dimension computed tomography (CT) volume.

22. A non-transitory computer readable medium storing computer program instructions for segmenting a structure of interest in medical imaging data, the computer program instructions when executed by a processor cause the processor to perform operations comprising:

generating a binary mask highlighting structures in medical imaging data, the highlighted structures comprising a connected component including a structure of interest;

computing a probability map by classifying voxels in the highlighted structures using a trained classifier;

performing a plurality of detaching operations on the highlighted structures to split the connected component into a plurality of detached connected components;

determining an optimal detaching parameter representing a number of the detaching operations; and classifying a detached connected component resulting from performing the number of detaching operations corresponding to the optimal detaching parameter as the structure of interest based on the probability map and the trained classifier.

23. The non-transitory computer readable medium as recited in claim 22, wherein generating a binary mask highlighting structures in medical imaging data comprises:

applying intensity thresholding to the medical imaging data to determine the highlighted structures.

24. The non-transitory computer readable medium as recited in claim 22, wherein computing a probability map by classifying voxels in the highlighted structures using a trained classifier comprises at least one of:

computing a probability of each voxel in the highlighted structures as being a bone using a trained bone classifier; and computing a probability of each voxel in the highlighted structures as being a vessel using a trained vessel classifier.

25. The non-transitory computer readable medium as recited in claim 22, wherein performing a plurality of detaching operations on the highlighted structures to split the connected component into a plurality of detached connected components comprises:

performing a plurality of erosion operations to remove a layer of voxels from a periphery of the highlighted structures.

26. The non-transitory computer readable medium as recited in claim 22, wherein determining an optimal detaching parameter representing a number of the detaching operations comprises:

determining the optimal detaching parameter representing the number of the detaching operations that provides for a maximum information gain.

27. The non-transitory computer readable medium as recited in claim 22, wherein determining an optimal detaching parameter representing a number of the detaching operations comprises:

generating a tree graph for the connected component in the highlighted structures representing how the connected component splits into the plurality of detached connected components over the plurality of detaching operations.

28. The non-transitory computer readable medium as recited in claim 27, wherein determining an optimal detaching parameter representing a number of the detaching operations further comprises:

calculating a probability for each node in the tree graph based on the probability map; and determining the optimal detaching parameter based on the probability for each node in the tree graph.

29. The non-transitory computer readable medium as recited in claim 27, wherein generating a tree graph for the connected component in the highlighted structures representing how the connected component splits into the plurality of detached connected components over the plurality of detaching operations comprises:

representing the plurality of detached connected components as respective child nodes in the tree graph.

30. The non-transitory computer readable medium as recited in claim 22, wherein determining an optimal detaching parameter representing a number of the detaching operations comprises:

after each of the plurality of detaching operations:

labeling each detached connected component resulting from a respective one of the plurality of detaching operations based on probabilities associated with voxels in the respective detached connected component; and dilating each labeled detached connected component.

31. A method for segmenting an aorta from a contrast-enhanced computed tomography (CT) volume, comprising:

generating a binary mask highlighting structures in the contrast-enhanced CT volume, the highlighted structures comprising a connected component including an aorta;

computing a probability map by classifying voxels in the highlighted structures using a trained classifier;

performing a plurality of detaching operations on the highlighted structures to split the connected component into a plurality of detached connected components;

determining an optimal detaching parameter representing a number of the detaching operations; and classifying a detached connected component resulting from performing the number of detaching operations corresponding to the optimal detaching parameter as the aorta based on the probability map and the trained classifier.

\* \* \* \* \*